(12) United States Patent  
Walter et al.

(10) Patent No.: US 7,712,295 B2
(45) Date of Patent: May 11, 2010

(54) AGRICULTURAL MACHINE COMPRISING A MOTOR VEHICLE AND SEVERAL WORKING UNITS INTENDED TO CUT PLANT PRODUCTS

(75) Inventors: Rene Walter, Goetzenbruck (FR); Cedric Halter, Wasselonne (FR); Philippe Potier, Veckersviller (FR)

(73) Assignee: Kuhn S.A., Saverne (FR)

( * ) Notice: Subject to any disclaimer, the term of this patent is extended or adjusted under 35 U.S.C. 154(b) by 204 days.

(21) Appl. No.: 11/416,202

(22) Filed: May 3, 2006

(65) Prior Publication Data

US 2006/0254238 A1 Nov. 16, 2006

(30) Foreign Application Priority Data

May 10, 2005 (FR) .................................. 05 51207

(51) Int. Cl.
*A01B 73/00* (2006.01)
(52) U.S. Cl. ................. 56/228; 296/190.04; 296/190.05
(58) Field of Classification Search .................... 56/134, 56/228; 172/311; 296/190.04, 190.05
See application file for complete search history.

(56) References Cited

U.S. PATENT DOCUMENTS

| | | | | |
|---|---|---|---|---|
| 3,398,984 A | * | 8/1968 | Ajero | ..................... 296/190.04 |
| 4,409,780 A | * | 10/1983 | Beougher et al. | ............. 56/228 |
| 4,790,711 A | * | 12/1988 | Calaway | ..................... 414/635 |
| 4,903,470 A | * | 2/1990 | Hemker et al. | ................ 56/228 |
| 5,566,537 A | | 10/1996 | Kieffer et al. | |
| 5,852,921 A | | 12/1998 | Neuerburg et al. | |
| 5,911,625 A | * | 6/1999 | von Allworden | ............ 460/119 |
| 6,775,969 B2 | * | 8/2004 | Wuebbels et al. | ............. 56/208 |
| 7,222,480 B2 | * | 5/2007 | Erdmann et al. | .............. 56/228 |
| 2005/0229574 A1 | | 10/2005 | Walter et al. | |

FOREIGN PATENT DOCUMENTS

| | | |
|---|---|---|
| EP | 1 093 707 A1 | 4/2001 |
| EP | 1129981 A2 * | 9/2001 |
| EP | 1 405 556 A2 | 4/2004 |
| FR | 2 837 347 | 9/2003 |

\* cited by examiner

*Primary Examiner*—Alicia M Torres
(74) *Attorney, Agent, or Firm*—Oblon, Spivak, McClelland, Maier & Neustadt, L.L.P.

(57) ABSTRACT

An agricultural machine comprising:
- a motor vehicle that can move in two opposite directions, a direction of travel for work, and a transport direction,
- a driver's cabin that can move along the motor vehicle,
- at least one central support connected to the lifting device of the motor vehicle and supporting front working units intended to cut standing plant products, the working units that protrude laterally from the motor vehicle being able to be moved by means of the central support into a transport position in which they are positioned longitudinally at least partly above the motor vehicle.

12 Claims, 5 Drawing Sheets

_US 7,712,295 B2_

AGRICULTURAL MACHINE COMPRISING A MOTOR VEHICLE AND SEVERAL WORKING UNITS INTENDED TO CUT PLANT PRODUCTS

BACKGROUND OF THE INVENTION

1. Field of the Invention

The present invention relates to an agricultural machine comprising a motor vehicle and several working units intended to cut standing plant products, said working units being connected to said motor vehicle.

2. Discussion of the Background

In the prior art, there is such an agricultural machine comprising a motor vehicle and at least two front working units which protrude laterally in order to cover a wide cutting area and improve the productivity of the machine.

Such mowers have a working width that may reach some ten meters; to move them on the roads, it has been necessary to provide a reduced width transport position in which the working units are pivoted to the vertical.

In this transport configuration, a first problem is posed which is that of the visibility of the road by the driver of the vehicle, the working units being extremely obstructive in this configuration.

A second problem, associated with the positioning of the working units raised and in front of the tractor, is that of the stability of the vehicle particularly on uneven ground. The instability of the vehicle may, in certain unfavorable conditions, cause it to overturn.

In order to cover as large an area as possible in the field, the working units are increasingly long. The folding of said working units around the motor vehicle, into the transport position, in order to comply with the maximum dimension authorized for traveling on the public roads, therefore leads to a serious problem concerning the visibility from the vehicle cabin for driving and to an instability of said vehicle.

In the agricultural machines previously described and in the context of the present invention, the working units placed in front of the motor vehicle may be substantially in line and may be elements only for cutting the products, or cutting elements associated with a device for conditioning cut products, that is therefore machines classified in the categories of mowers or mower-conditioners. Such machines may in addition comprise means for grouping the cut products into windrows in order to make them easier to pick up by means of a forage harvester for example.

SUMMARY OF THE INVENTION

The object of the invention is to solve the main previously specified problems by proposing an agricultural machine on which the visibility is good during work and during transport and on which, in the transport position, the folding of the working units does not cause instability of the vehicle when driven on roads and tracks.

The present invention therefore relates to an agricultural machine comprising a motor vehicle carrying working units intended to cut standing plant products, at least two of these working units being placed, during work and seen in the direction of travel in work, in front of said motor vehicle, and protruding laterally from the latter, wherein said agricultural machine comprises:

a motor vehicle that can move in two opposite directions, a direction of travel for work, and a transport direction, a driver's cabin that can move along the motor vehicle, at least one central support connected to a lifting device of the motor vehicle and supporting said front working units, which front working units that protrude laterally from the motor vehicle being able to be moved by means of the central support into a transport position in which they are positioned longitudinally at least partly above the motor vehicle.

The placement of the working units and the folded configuration around the motor vehicle according to the invention lead to an agricultural machine having a good output with a reduced transport width. The vehicle is compact and the weights are relatively balanced, which makes it stable during movements between working zones and on the roads.

In the transport position, the agricultural machine according to the invention is relatively compact and its height may be less than four meters, which is therefore within the authorized highway gage.

The folding method allowing the transition from the working position to the transport position and the reciprocal transition may be optimized with the use of a minimal structure of reduced weight and comprising a limited number of hydraulic cylinders for the maneuver, which makes it a low cost machine taking account of its performance.

The use of a mower with multiple working units may reach twelve meters with three cutting units; this machine allows a high work rate and therefore substantially reduces the number of mowing days. For farmers harvesting large areas, this solution is very attractive.

BRIEF DESCRIPTION OF THE DRAWINGS

Other features and advantages of the invention will emerge from the following description with respect to the appended drawings that are given only as nonlimiting examples.

DESCRIPTION OF THE PREFERRED EMBODIMENT

Figure 1:
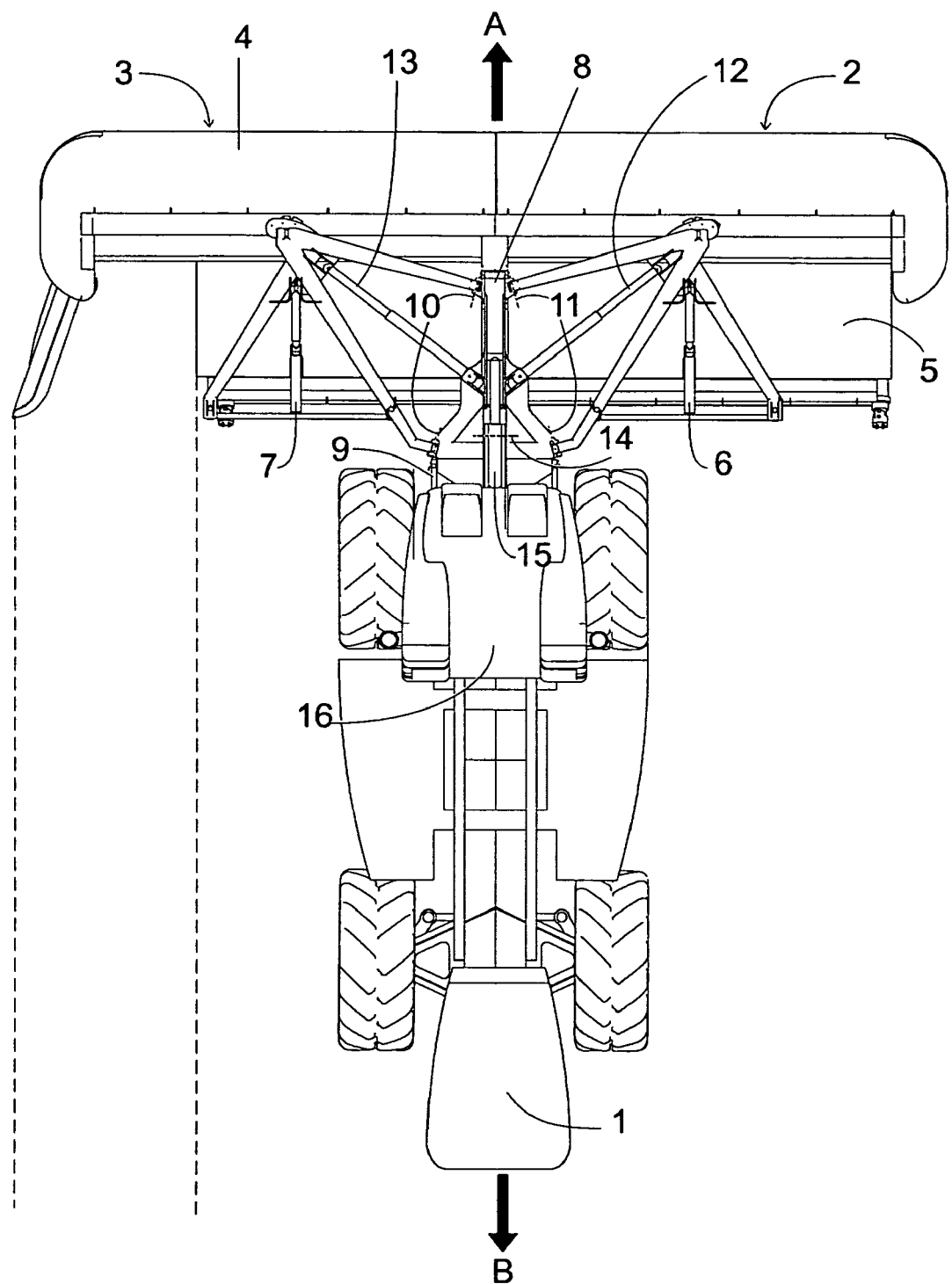
FIG. 1 is a top view of an agricultural machine according to the invention having two front working units, said working units being in the working position.

According to an advantageous embodiment of the invention illustrated in FIG. 1, the motor vehicle 1 has two front working units 2, 3 substantially in line and protruding laterally therefrom. In the working position illustrated in FIGS. 1 and 2, the direction of travel A shown by the arrow is that of working in the field.

In the application of mower-conditioners which is preferably involved, the front working units 2, 3 comprise at least one cutterbar 4, a device for conditioning cut products and a device 5 for grouping these cut products into windrows. This forage grouper 5 is situated at the rear of the cutterbar 4.

Various known devices for conditioning products immediately after cutting, making it possible to break the protective layer of the cut plants, in order to accelerate the drying time and shorten the period before collection, are built into or can be built into the front units, in the context of the invention.

The forage grouper 5, which may consist of a conveyor belt, makes it possible to gather the plants together, in a back-and-forth movement, onto a windrow that is easy to pick up with a forage harvester for example. The forage grouper 5 may advantageously be moved away from the cutterbar 4 to make it inactive if the user should wish to allow the plants to dry in place in order to make them into hay.

The means making it possible to move the forage grouper 5 away and closer may be, for example, hydraulic cylinders 6, 7 placed on the structure connecting the front working units 2, 3 to the motor vehicle 1.

According to the invention, the two in-line front working units 2, 3 are connected to and articulated on the motor vehicle 1 by means of a central support 8 that is in one or several parts and is supported by a lifting device 9 of the motor vehicle.

The two front units 2, 3 are articulated on the central support 8 by means of slightly oblique axes 10, 11, about which they may be lifted to a substantially vertical position with the aid of hydraulic cylinders 12, 13.

Figure 3:
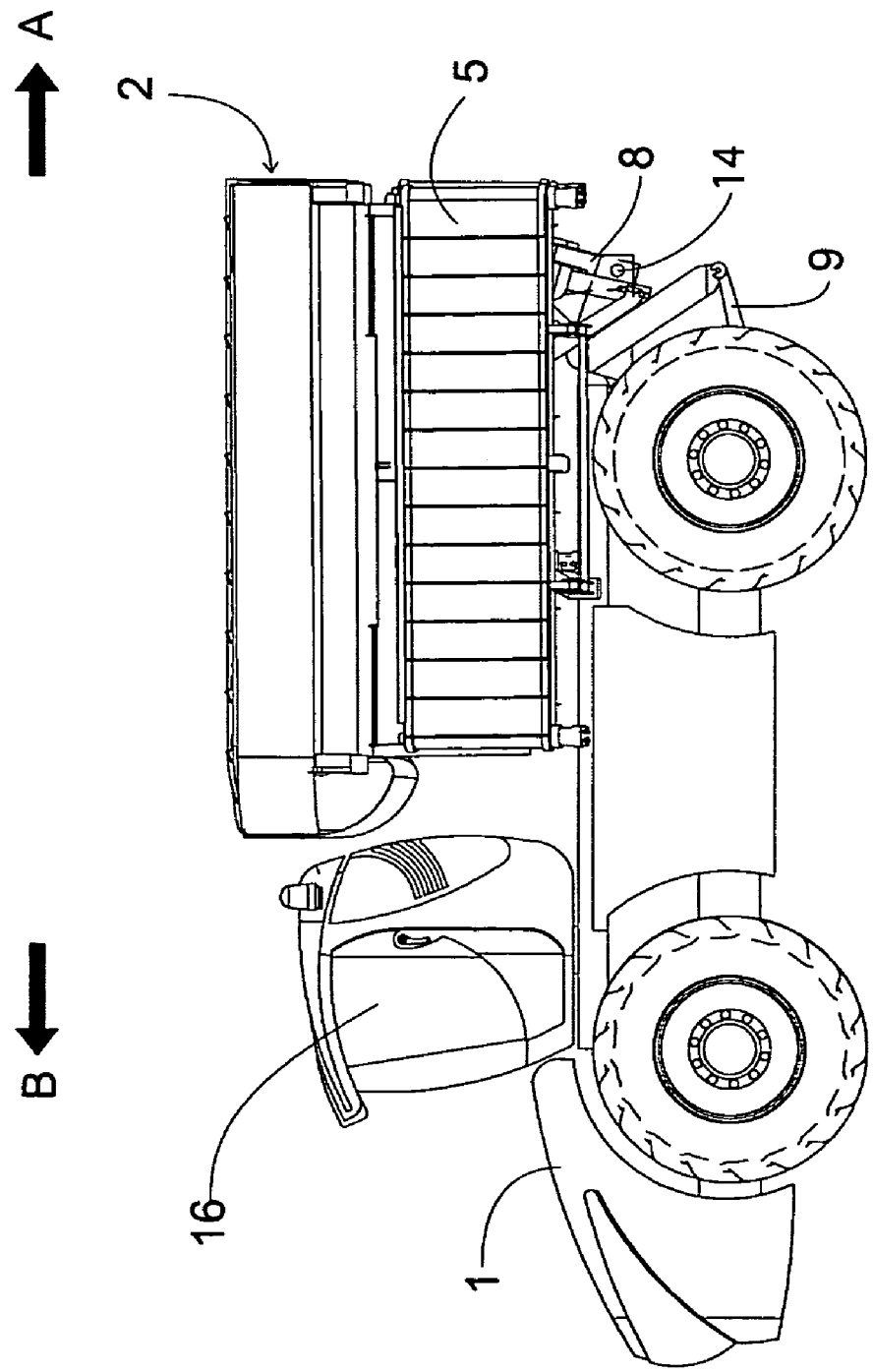
FIG. 3 illustrates the agricultural machine shown in FIG. 2, in which the working units are folded into the transport position and in which the driver's cabin is moved and pivoted from 180°.

The central support 8 comprises a transverse axis of articulation 14 about which the two front units may be moved by means of a hydraulic cylinder 15 to reach the transport position illustrated in FIG. 3 and also to return from the transport position to the working position.

In the working position of FIG. 1, the driver's cabin 16 is situated as close as possible to the front working units 2, 3. It is oriented in the direction A and is moved forward so that the driver has good visibility over the cutting zone in the field.

Figure 2:
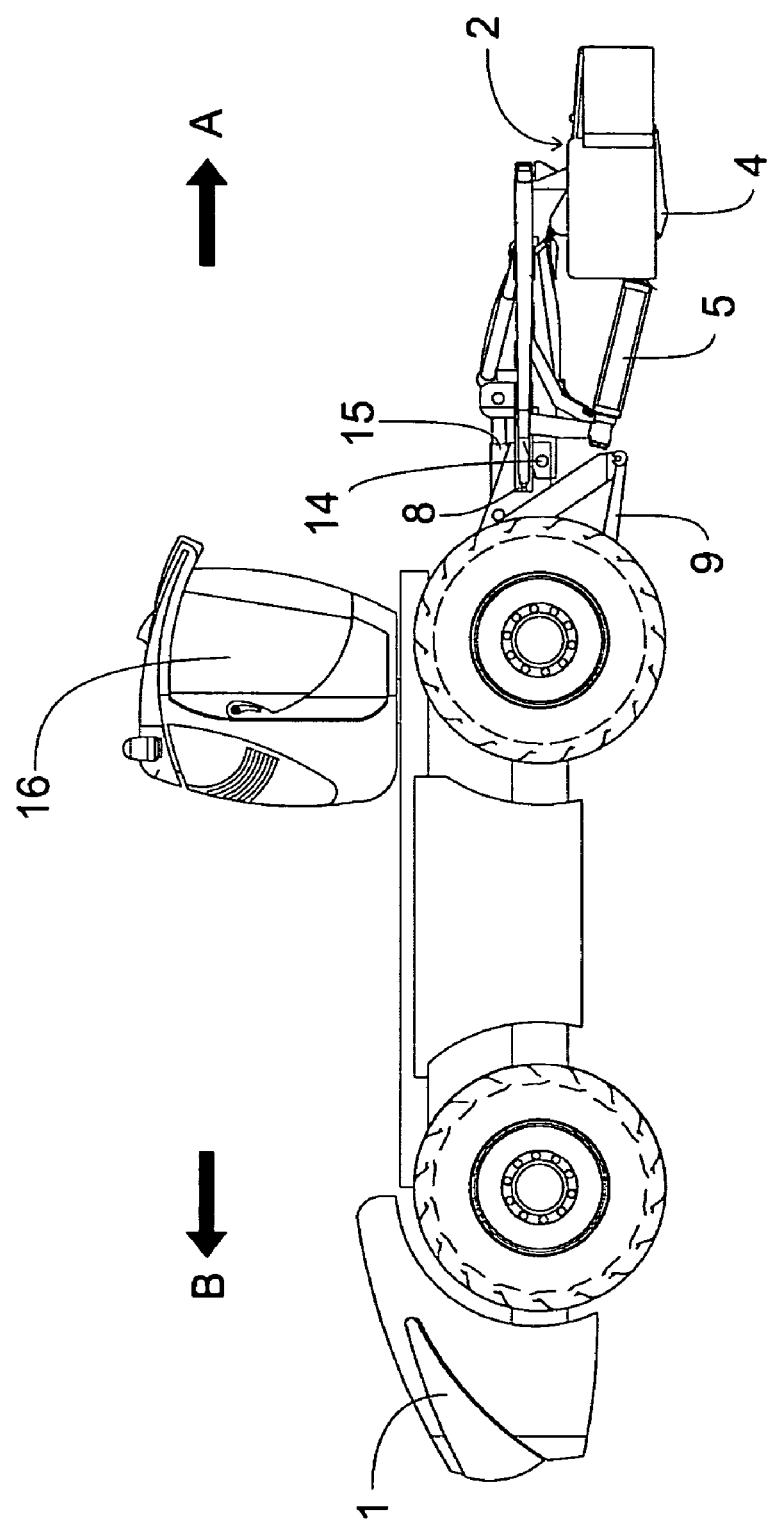
FIG. 2 is a side view of the agricultural machine shown in FIG. 1.

FIG. 2 shows, in side view, the motor vehicle in the working position and particularly the positioning of the driver's cabin 16 as close as possible to the working units 2, 3.

FIG. 3 illustrates the transport position in which the driver's cabin 16 has been pivoted from 180° and moved on the motor vehicle 1 to the opposite end from the working units 2, 3. For this purpose, the cabin 16 may be mounted on a pivot that can itself be moved longitudinally by means of cylinders or cables on the vehicle 1. Said working units have been placed longitudinally above the front part of the motor vehicle 1 under the combined action of the groups of cylinders 12, 13 and 15. This arrangement of the cabin 16 and of the working units 2 and 3 makes it possible to obtain good weight distribution on the motor vehicle, which gives it good stability.

To place the front working units 2, 3 in the transport position, from the working position, these front units are first pivoted about the axes 10 and 11 into a substantially vertical position, by means of the hydraulic cylinders 12, 13, then the assembly formed is folded in the direction of transport B, into a substantially horizontal position, by a pivoting of about 90° about the transverse axis of articulation 14 by means of the hydraulic cylinder 15.

The hydraulic cylinders 12, 13 are placed on either side of the central support 8 to which they are attached and are fixed at their end opposite to the corresponding working unit 2, 3 substantially in its middle, as shown in FIG. 1.

In the transport position illustrated in FIG. 3, the driver's cabin 16 has been pivoted from 180° about a vertical pivot and moved back in the direction B so as to allow the motor vehicle to move in the transport direction B. The transport direction B is opposite to the direction of travel A for the work of cutting the products.

Moving the driver's cabin 16 into the transport position makes it possible to clear space on the motor vehicle for folding the front working units 2, 3 and the structure supporting said front units at least partly above the motor vehicle 1.

Folding the front working units 2, 3 into the transport position places them longitudinally along the motor vehicle 1, in a configuration in which the machine is very compact, its height preferably being less than four meters and its width being reduced. In addition, the loads are relatively well distributed on the front axle and the rear axle, thus promoting good stability of the machine in transport.

All the front units 2, 3, after folding, furthermore virtually do not increase the width of the motor vehicle 1.

According to the invention, and as illustrated in FIG. 3, it appears clearly that, in the transport position, the driver of the vehicle is in no way obstructed by the folded front units 2, 3 for driving on the roads.

The agricultural machine is suitable, particularly in terms of motorization, and particularly in terms of driving means, to allow travel in both directions A and B.

Figure 4:
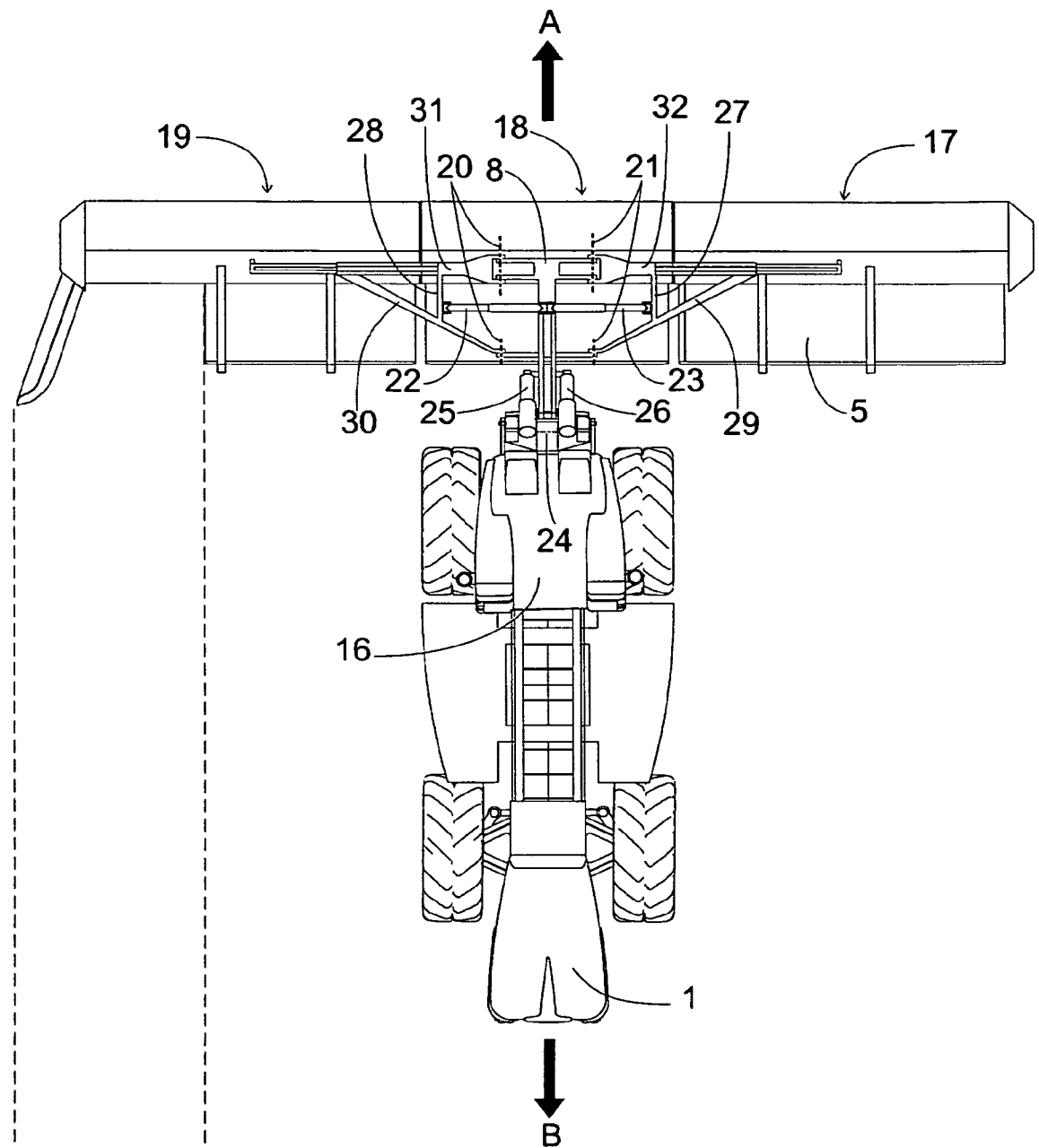
FIG. 4 shows an agricultural machine having three front working units in the working position.
Figure 5:
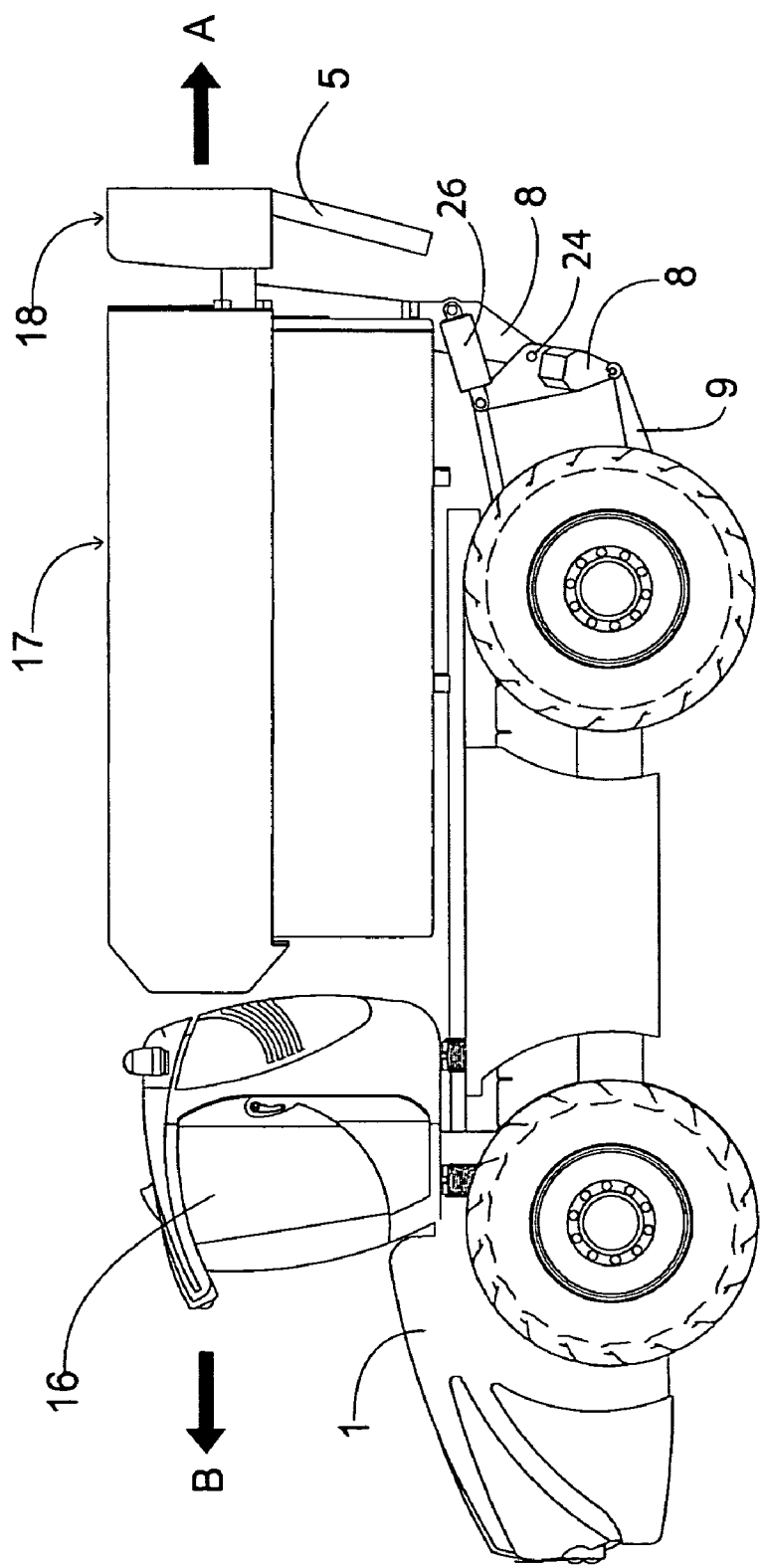
FIG. 5 illustrates the transport position of the agricultural machine shown in FIG. 4 with the driver's cabin moved and pivoted from 180° and the working units folded.

According to another exemplary embodiment of the agricultural machine shown in FIGS. 4 and 5, the motor vehicle comprises a movable driver's cabin 16 and three front working units 17, 18, 19 that are substantially in line for cutting the plant products.

The front unit 18, situated in the middle, is connected to the central support 8 by means of rods while the two side front units 17, 19 are articulated on the central support 8 by means of axes 20, 21 directed in the direction of travel in work A.

The two side front units 17, 19 can be folded about the axes 20, 21 by means of hydraulic cylinders 22, 23 to a substantially vertical position. Each hydraulic cylinder 22, 23 is attached at one end to the central support 8 and at the other end to linking bars 27, 28 connected to the working units 17, 19.

The linking bars 27, 28 are attached at one end to cross-members 29, 30, and at the other end to beams 31, 32 connected to the axes 20 and 21.

The assembly, formed by the linking bars 27, 28, the cross-members 29, 30 and the beams 31, 32 forms a carrying structure making it possible to move the front units 17, 19 by means of the hydraulic cylinders 22, 23.

The central support 8 comprises a transverse axis of articulation 24 (see FIG. 5) and one or two hydraulic cylinders 25, 26 making it possible to fold the working units 17, 18, 19 about said axis 24 to the transport position, after a pivoting of about 90° in the transport direction B.

In the agricultural machine shown in FIG. 5, the central front unit 18 is situated, in the transport position, in a substantially vertical plane and perpendicular to the two side front units 17, 19 folded along the motor vehicle 1.

This movement of said central front unit 18 between the working position and the transport position is achieved by a rotation of about 90° about the transverse axis 24.

Several variants are possible for the means allowing the folding of the front working units around the motor vehicle, particularly with respect to the number of hydraulic cylinders and their positioning, and for the placing of said working units in the transport position, without departing from the context of the invention.

A greater or lesser number of front units may be envisaged and said units may be mowers or mower-conditioners.

In the situation corresponding to more than two front units, various folding modes may be imagined for placing said working units on the motor vehicle; these various modes are included in the invention.

The pivoting driver's cabin may have various shapes and dimensions, may contain all or only a part of the usual functionalities associated with the working units and the driving of the motor vehicle.

As a variant, a nonpivoting driver's cabin may be provided with, in this case, a second steering wheel and the necessary dual controls, with, where appropriate, a pivoting seat for the driver or a second driving position for the opposite direction. The various possible combinations in translation along the motor vehicle, with or without 180° rotation of the driver's cabin are provided in the context of the invention.

Naturally, the invention is not limited to the embodiments described and shown as examples, but it also comprises all the technical equivalents and their combinations.

What is claimed as new and desired to be secured by letters Patent of the United States is:

1. An agricultural machine comprising a motor vehicle to which are connected several mowing units configured to cut standing plant products, at least two of these mowing units being front mowing units placed horizontally in a working position and seen in a working direction of travel in front of said motor vehicle and protruding laterally from the motor vehicle, wherein said motor vehicle can move in two opposite directions, the working direction of travel in the working position, and a transport direction of travel in a transport position, wherein said agricultural machine comprises:
    a single driver's cabin that can move along the length of the motor vehicle, wherein in a first position said single driver's cabin controls said agricultural machine in the working position and faces said working direction of travel at a first end of the motor vehicle and in a second position said single driver's cabin controls said agricultural machine in the transport position and faces said transport direction at a second end of the motor vehicle opposite the first end;
    at least one central support connected to a lifting device of the motor vehicle, wherein said at least two front mowing units are articulated on the central support by axes directed substantially in the working direction of travel and about which said at least two front mowing units are movable relative to the central support about 90° from the horizontal working position into substantially vertical positions; and
    said central support comprises an axis of articulation transverse to the direction of travel about which, as a unit and under power of the lifting device, said central support and said at least two vertically-positioned front mowing units move together about 90° to position the central support from a substantially horizontal position in the working position to a substantially vertical position in the transport position and to position said at least two front mowing units longitudinally and horizontally at least in part above the motor vehicle and to the rear of the driver's cabin in said transport position.

2. An agricultural machine as claimed in claim 1, wherein the front mowing units are pivoted into said substantially vertical position by hydraulic cylinders.

3. An agricultural machine as claimed in claim 2, wherein each hydraulic cylinder is attached at one end to the central support and at an opposite end to a front mowing unit.

4. An agricultural machine as claimed in claim 1, wherein the front mowing units raised into said substantially vertical position are then folded into said substantially horizontal position, in the direction of transport, longitudinally above the motor vehicle, by hydraulic cylinders.

5. An agricultural machine as claimed in claim 1, wherein said agricultural machine comprises three front mowing units substantially in line, and wherein two lateral front mowing units are articulated on the central support by axes directed in the working direction.

6. An agricultural machine as claimed in claim 5, wherein said at least two lateral front mowing units are placed in the transport position by pivoting into said substantially vertical position by hydraulic cylinders, then brought above the motor vehicle by a pivoting of about 90° about said axis of articulation by at least one hydraulic cylinder.

7. An agricultural machine as claimed in claim 5, wherein a central front mowing unit, in the transport position, is positioned substantially vertically, perpendicular to the two lateral front mowing units by pivoting said central front mowing unit at an angle of about 90° about said axis of articulation.

8. An agricultural machine as claimed in claim 1, wherein the front mowing units comprise at least one cutterbar, a device for conditioning mown products and a grouper of the products into windrows.

9. An agricultural machine as claimed in claim 1, wherein, in said working position, said driver's cabin is positioned above a front part of said motor vehicle, and in said transport position, said driver's cabin is positioned above a rear part of said motor vehicle and said front mowing units are in said substantially horizontal position above said front part of said motor vehicle.

10. An agricultural machine as claimed in claim 9, wherein, in said working position, said driver's cabin faces said front mowing units in front of said motor vehicle, and in said transport position, said driver's cabin faces a rear of said motor vehicle away from said front mowing units in said substantially horizontal position.

11. An agricultural machine as claimed in claim 1, wherein, in the working position, said central support extends in front of said axis of articulation relative to the working direction of travel.

12. An agricultural machine as claimed in claim 11, wherein, in the transport position, said central support extends above said axis of articulation.

* * * * *